United States Patent [19]
Mack et al.

[11] 4,278,321
[45] Jul. 14, 1981

[54] POWER DIVIDER WITH RANDOMLY VARYING INCREMENTAL POWER TRANSFER

[75] Inventors: Iris M. Mack, Berkeley, Calif.; Harrison E. Rowe, Rumson, N.J.; Ronald V. Schmidt, Woodside, Calif.

[73] Assignee: Bell Telephone Laboratories, Incorporated, Murray Hill, N.J.

[21] Appl. No.: 80,092

[22] Filed: Sep. 28, 1979

[51] Int. Cl.³ .............................................. G02B 5/14
[52] U.S. Cl. .................................................. 350/96.12
[58] Field of Search ................ 350/96.12, 96.13, 96.14

[56] References Cited
U.S. PATENT DOCUMENTS

| | | | |
|---|---|---|---|
| 3,558,213 | 1/1971 | Marcatili | 350/96.12 |
| 3,995,311 | 11/1976 | Taylor | 350/96.14 |
| 4,012,113 | 3/1977 | Kogelnik et al. | 350/96.14 |
| 4,142,775 | 3/1979 | Ramaswamy et al. | 350/96.14 |

OTHER PUBLICATIONS

S. Miller, "Coupled Wave Theory and Waveguide Applications", in *Bell System Tech. Jour.*, May 1954, pp. 661-719.

*Primary Examiner*—Stewart J. Levy
*Attorney, Agent, or Firm*—Sylvan Sherman

[57] ABSTRACT

By randomly varying the difference in the phase constants and/or the coupling coefficient along the lengths of two or more wavepaths, an equal division power divider is obtained whose operation is not critically dependent upon its dimensions.

7 Claims, 4 Drawing Figures

POWER DIVIDER WITH RANDOMLY VARYING INCREMENTAL POWER TRANSFER

TECHNICAL FIELD

This invention relates to power dividers.

BACKGROUND OF THE INVENTION

As described by S. E. Miller in his article entitled "Coupled Wave Theory," published in the May 1954 issue of the Bell System Technical Journal, pp. 661–719, the power that is coupled between the waveguides of a directional coupler varies as a function of the length of the coupling interval, the coupling coefficient, and the propagation constants of the two waveguides. At microwave frequencies and below, it is relatively easy to design and construct a directional coupler having any prescribed power division ratio. At optical frequencies, however, the fabrication of a directional coupler having a particular set of operating characteristics is much more difficult. Accordingly, various means have been devised to compensate, for example, for inadvertent differences in propagation constants, and to adjust the effective length of the coupler so as to obtain the desired power division. (See, for example, U.S. Pat. No. 4,012,113.) While these various techniques are effective, they tend to complicate coupler structures.

The object of the present invention is to simplify the structure of directional couplers.

SUMMARY OF THE INVENTION

A directional coupler, in accordance with the present invention, comprises at least a pair of waveguides coupled together over a coupling interval L, characterized in that the incremental power transferred between wavepaths varies randomly as a function of the distance along said waveguides. This variation can be accomplished either by varying the difference in the phase constants ($\beta_1-\beta_2$) of the two waveguides, and/or by varying the coefficient of coupling c. For the case of a pair of waveguides where the coupling is constant and the phase constant difference $\Delta\beta(z)$ varies randomly along the coupling interval about zero average value, it is shown that a 3 dB coupler of minimum length is obtained when B, the spectral density of the phase difference $\Delta\beta(z)$ at low spatial frequencies, is equal to eight times the coupling coefficient c. If, however, the coupler is longer than this minimum length, it is an advantage of the invention that none of the waveguide dimensions are critical to equal power division.

DETAILED DESCRIPTION

Figure 1:
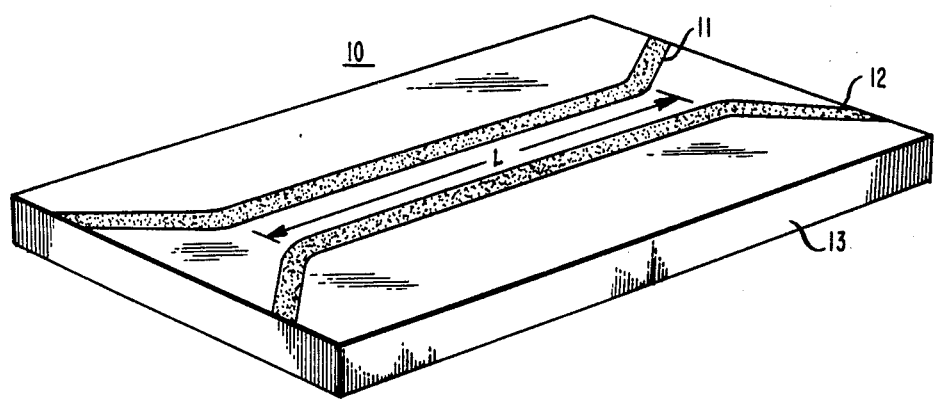
FIG. 1 shows a prior art optical directional coupler.

Referring to the drawings, FIG. 1 shows a typical prior art directional coupler 10 comprising a pair of transparent (low-loss) dielectric strips 11 and 12 embedded in a dielectric substrate 13 of lower refractive index. The strips, which are normally widely spaced apart, extend relatively close to each other over a coupling interval L. Typically, the spacing between the strips is uniform over the coupling interval, and coupling between the guides can be defined by a constant coefficient of coupling c. In addition, in the conventional coupler, the phase constant, $\beta_1$ and $\beta_2$, of each of the strips is constant over the coupling interval. For each a coupler, power is coupled back and forth between the two guides in an oscillatory manner as a function of the difference in phase constants (i.e., $\Delta\beta=\beta_1-\beta_2$), and the length L of the coupling interval. This back and forth coupling characteristic is illustrated by the curves on page 681 of the above-cited Miller article which shows the manner in which the signal amplitudes in the two waveguides vary as a function of distance along the coupling interval for different values of $\Delta\beta$. In theory, these curves can be used to design a directional coupler having any prescribed power division ratio. At optical frequencies, however, it is relatively difficult to fabricate the guiding strips so as to achieve the design specifications. To compensate for any variations in coupler parameters produced during the fabrication process, one practice is to impress a voltage across the structure and utilize and electrooptic effect as a way of achieving the desired coupler characteristics.

Figure 2:
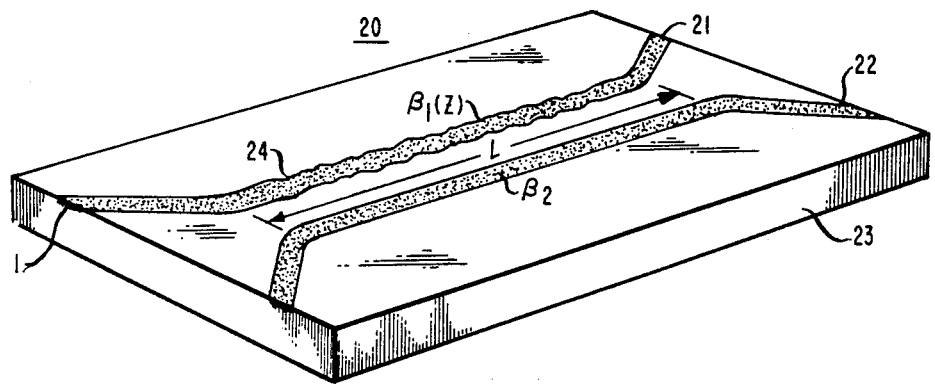
FIG. 2 shows one embodiment of a directional coupler in accordance with the present invention.

One alternative to the above-described technique, in the case of a 3 dB coupler, is based upon the discovery that if the difference in the phase constants of the two guides is made to vary in a random manner, there is a critical coupler length beyond which the power division is substantially independent of the coupler dimensions. Thus, in a 3 dB optical coupler in accordance with the present invention, the phase constant of at least one of the optical strips is randomly varied along its length. This is illustrated in FIG. 2 which shows a 3 dB optical directional coupler 20 comprising, as in FIG. 1, a pair of dielectric strips 21 and 22 embedded in a substrate 23 of lower refractive index. Unlike the prior art coupler, in the embodiment of FIG. 2 at least one of the strips 21 is fabricated such that the phase constant along the strip varies randomly. This effect can be produced, for example, by inducing variations 24 in the cross-sectional dimensions of the strip as it is deposited onto substrate 23. The other strip 22 can either be made uniform over its length or, alternatively, can also be made to have random phase variations over the coupling interval.

If a signal is applied to input port 1 of strip 21, it can be shown that the average power, $P_1$, at any point, z, along strip 21 is given by $$P_1 = \tfrac{1}{2}\left[1 + e^{-Bz/4}\left(\cos 2Acz + \frac{B}{8c}\,\frac{\sin A2cz}{A}\right)\right] \quad (1)$$

where $$A = \sqrt{1 - \left(\frac{B}{8c}\right)^2}\,; \quad (2)$$

c is the coefficient of coupling between the strips; the average value of $\Delta\beta$ is zero; and B is the spectral density of $\Delta\beta(z)$ at low spatial frequencies.

Assuming negligible losses in the strips, the average power at any point z along waveguide 22 is $$P_2 = 1 - P_1 \quad (3)$$

As seen in equation (1), there are three important ranges of interest defined by the ratio B/c. For B/c less than 8, the expression under the radical is positive; for B/c=0, this expression is zero; and for B/c greater than 8, it is negative.

For the special case of uniform coupling and no variations in $\Delta\beta$ (i.e., $\beta=0$), the expressions for the average powers are $$P_1 = \cos^2 2cz \quad (4)$$

and $$P_2 = \sin^2 2cz \quad (5)$$

These are the expressions for an ideal coupler as given by Miller.

For the case of $\Delta\beta \neq 0$ and values of B/c greater than zero but less than 8, $P_1$ is a damped, oscillatory function which approaches one-half for large values of cz.

For B/c equal to 8, $P_1$ reduces to $$P_1 = \tfrac{1}{2}\left\{1 + e^{-Bz/4}\left(1 + \frac{Bz}{4}\right)\right\} = \tfrac{1}{2}[1 + e^{-2cz}(1 + 2cz)] \quad (6)$$

For B/c greater than 8, $P_1$ is given by $$P_1 = \tfrac{1}{2}\left[1 + e^{-Bz/4}\left\{\cos n\left(D \cdot \frac{Bz}{4}\right) + \frac{\sin n\left(D \cdot \frac{Bz}{4}\right)}{D}\right\}\right] \quad (7)$$

where $$D = \sqrt{1 - \left(\frac{8c}{B}\right)^2} \quad (8)$$

Figure 3:
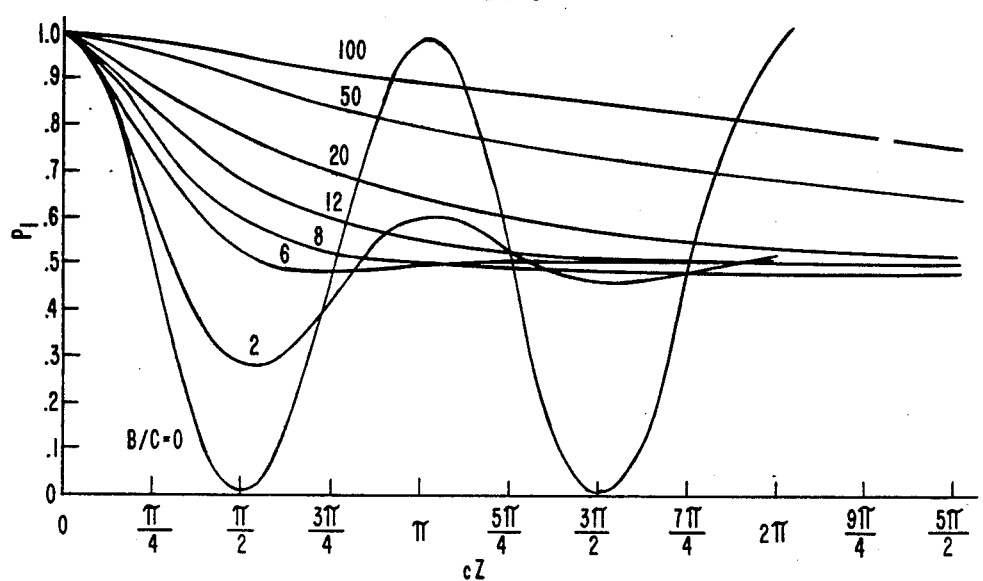
FIG. 3 shows a family of curves illustrating the manner in which the power in one of the coupler strips varies along the coupler length for different values of the ratio B/c.

FIG. 3 is a plot of $P_1$ for these various values of B/c. It will be noted that all of the curves for which B/c is greater than zero asymptomatically approach one-half. That is, half of the power remains on the input strip and half is coupled to the other strip. Thus, any directional coupler, if long enough, will serve as an equal power splitter by the simple expedient of randomly varying the phase constant of one or both of the strips making up the coupler. However, the shortest coupler is obtained when B/c is approximately equal to eight. Accordingly, where length is an important consideration, the density and magnitude of the phase variations are advantageously such that the ratio of B to c is eight or slightly greater.

Techniques for fabricating integrated optical circuits are well known in the art. See, for example, the article by D. R. Herriott et al. entitled "EEBS: A Practical Electron Lithographic System" published in the July 1975 issue of the IEEE Transactions on Electron Devices, Vol. ED-22, No. 7, wherein a method for fabricating masks is described. Of particular interest is the variable spot scanning technique, described in the copending application by R. J. Collier et al., Ser. No. 855,608, filed Nov. 29, 1977, and assigned to applicants' assignee, which can be employed to vary the dimensions of a mask. This technique permits the generation of electron beams of variable cross-sectional configurations. For the purposes of the present invention, the beam cross-section is caused to vary in a random manner. A mask, thus produced, can then be used to fabricate a coupler in accordance with the present invention.

In the embodiment of FIG. 2, the phase constant of only one of the waveguides 21 is shown to be varied. Alternatively, the phase constants of both guides can be varied simultaneously in "push-pull" fashion. That is, the cross-section of one guide is increased as the cross-section of the other is decreased. To minimize losses due to scattering, the spatial wavelength of these variations is made long compared to the optical wavelength. On the other hand, they occur rapidly relative to the overall length of the coupler.

As indicated hereinabove, a minimum length coupler is produced when the ratio of B to c is approximately 8. As a first approximation in the design of an optimum length coupler, the overall length L is specified. From FIG. 3, it is noted that for B/c=8, the power $P_1$ is reduced to half at about $cz=\pi$. Thus, for the given z=L, we obtain $$c = \pi/L \quad (9)$$

which specifies the coefficient of coupling. Substituting this value of c, the spectral density is then computed to be $$B = 8\pi/L \quad (10)$$

Figure 4:
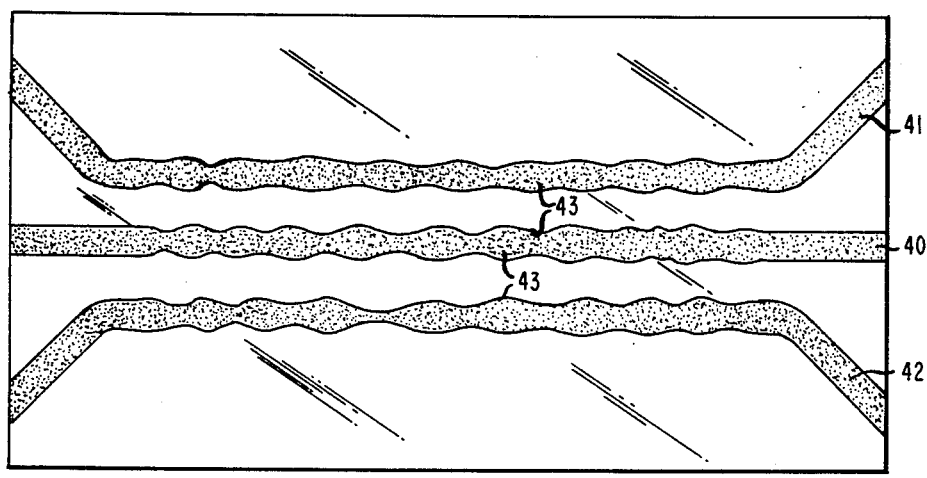
FIG. 4 shows an alternative embodiment of the invention.

FIG. 4 illustrates an extension of the principles of the invention to a three-way power split. In this embodiment, a first waveguide 40 is simultaneously coupled over a common coupling interval to two wavelengths 41 and 42 located on opposite sides of waveguide 40. As before, random perturbations 43 in the phase constants (and/or coupling coefficients) of the three guides result in the incident power propagating along waveguide 40 being divided equally among the three waveguides. In theory, the power can be divided equally among n waveguides.

As indicated hereinabove, the incremental power transfer can be varied either by varying the phase constant of one or more of the coupled guides and/or the coupling coefficient. When parameter is chosen to be varied will depend upon the particular embodiment of the coupler and the method of fabrication employed.

In the particular embodiments described, reference was made to optical couplers wherein the cross-sectional dimensions of one or more strip waveguides was changed as a means of varying the phase constant. Alternatively, the refractive index of the strip can be varied or, if one sought to vary c, the distance between coupled strips can be changed. Clearly, that technique which produces the most effective change at the lowest cost is most advantageously employed.

We claim:
1. A power divider comprising:
   at least two coupled wavepaths (21, 22) (40, 41);
   CHARACTERIZED IN THAT:
   a parameter of at least one of said coupled wavepaths varies randomly as a function of distance along said wavepaths.

2. The power divider according to claim 1 wherein the difference in the phase constants of said wavepaths varies randomly as a function of distance along said wavepaths.

3. The power divider according to claim 1 wherein the coefficient of coupling between said wavepaths varies randomly as a function of distance along said wavepaths.

4. The power divider according to claim 1 wherein said wavepaths are optical waveguides.

5. The power divider according to claim 1 comprising two coupled wavepaths.

6. The power divider according to claim 1 comprising three coupled wavepaths.

7. The power divider according to claim 2 wherein the ratio of the spectral density B of said phase difference variations to the coefficient of coupling c is equal to or greater than 8, with the average value of the phase constant difference equal to zero.

* * * * *

UNITED STATES PATENT AND TRADEMARK OFFICE
CERTIFICATE OF CORRECTION

PATENT NO. : 4,278,321

DATED : July 14, 1981

INVENTOR(S) : Iris M. Mack, Harrison E. Rowe and Ronald V. Schmidt

It is certified that error appears in the above—identified patent and that said Letters Patent is hereby corrected as shown below:

Column 1, line 44, "3 dB" should read --3dB--.
Column 3, line 36, that portion of equation (7) reading "cosn" should read --cosh--,
"sinn" should read --sinh--;
line 62, "EEBS" should read --EBES--.
Column 4, line 50, "When" should read --Which--.

Signed and Sealed this

Eighth Day of December 1981

[SEAL]

Attest:

GERALD J. MOSSINGHOFF

Attesting Officer    Commissioner of Patents and Trademarks